Sept. 27, 1960 J. LOEHR 2,954,233

ENDLESS MAGNETIC RECORD BELT AND SOUND TRACK CONTROL MEANS THEREFOR

Filed Sept. 23, 1957 2 Sheets-Sheet 1

INVENTOR.
JOHN LOEHR

BY Lyon & Lyon

ATTORNEYS

Sept. 27, 1960 J. LOEHR 2,954,233

ENDLESS MAGNETIC RECORD BELT AND SOUND TRACK CONTROL MEANS THEREFOR

Filed Sept. 23, 1957 2 Sheets-Sheet 2

INVENTOR.
JOHN LOEHR

BY Lyon & Lyon

ATTORNEYS

United States Patent Office 2,954,233
Patented Sept. 27, 1960

2,954,233

ENDLESS MAGNETIC RECORD BELT AND SOUND TRACK CONTROL MEANS THEREFOR

John Loehr, 119 N. Sycamore St., Los Angeles 36, Calif.

Filed Sept. 23, 1957, Ser. No. 685,667

2 Claims. (Cl. 274—4)

This invention relates to an endless magnetic record belt and sound track control means therefor. Relatively wide endless belts coated or impregnated with a magnetizable material have been used, particularly in dictating machines. Conventionally, such belt is driven by a drum while a combined recording and pickup head is advanced by a lead screw. This produces a helical sound track on the belt.

The belt is physically somewhat similar to the belt of plastic material used in another type of dictating machine wherein a stylus impresses a helical record groove. In this type of dictating machine the stylus readily enters the record groove and thus registers therewith. It cannot occupy a position out of registry or between grooves.

However, in the case of the helical magnetic sound track and recording and pickup head there is no means to compel registry. Slight lack of registry reduces volume whereas increased displacement tends to cause pickup from adjacent convolutions of the sound track which can render the recording completely unintelligible. Thus, on dictating machines utilizing a magnetizable recording belt a special control is provided to effect relative lateral displacement of the belt and recording and pickup head so as to bring the sound track and head into registry.

If an adjustment once made would be sufficient, the problem would be minor; however, unless a sprocket drive is provided between the belt and drum there is an indeterminate amount of slippage. If after dictating a portion of a record one wishes to review what has been said or to transcribe the record, the registry adjustment must be made to match the beginning portion of the record with the head. If the slippage remains constant, registry should be maintained during playback, but this is not always the case, particularly if the record and its transcription are performed on different machines. Furthermore, one cannot skip sections of the sound track by manually advancing the head and expect to find the sound track and head in registry. Still further, one can only determine registry by listening to the playback. This means that the section of the sound track which is of interest may be passed, requiring further resetting.

The nuisance occasioned by misregistry of the sound track and head is further compounded by the fact that normal control of the dictating machine while dictating is accomplished remotely by control means at the microphone, or while transcribing by foot controls. To provide remote control for the re-registering operation would be too complicated, thus one must turn to the machine itself from time-to-time during dictation or during transcribing to perform the reregistering operation.

It will thus be seen that proper registry between the recording and pickup head and the sound track poses a serious problem in the use of magnetizable belts. In the light of the problem as outlined above, the objects of this invention include:

First, to provide an endless record belt and sound track control means whereby registry of the recording and pickup head with the sound track is so arranged that registry is maintained or regained within one convolution of the belt irrespective of slippage between the drive drum and belt, irrespective of manual or automatic advancement or back movement of the recording and pickup head, irrespective of removal and replacement of the belt on the dictating machine, and irrespective of use of the belt on different machines having said sound track control means.

Second to provide an endless record belt and sound track control means wherein each convolution of the sound track includes a nonhelical section and a helical section, and wherein a device is incorporated in the belt for causing operation of said sound track control means in such a manner that said helical and nonhelical sections of each convolution of the sound track are disposed in predetermined circumferential relation with said device.

Third, to provide an endless record belt wherein the sound track, although arranged for particular cooperation with a machine equipped with a special sound track control means, may be arranged for interchangeable use on a machine not so equipped; that is, said sound track may be recorded by a machine equipped with said control means, yet may be transcribed from a machine not so equipped.

With the above and other objects in view as may appear hereinafter, reference is directed to the accompanying drawings in which.

Figure 1:
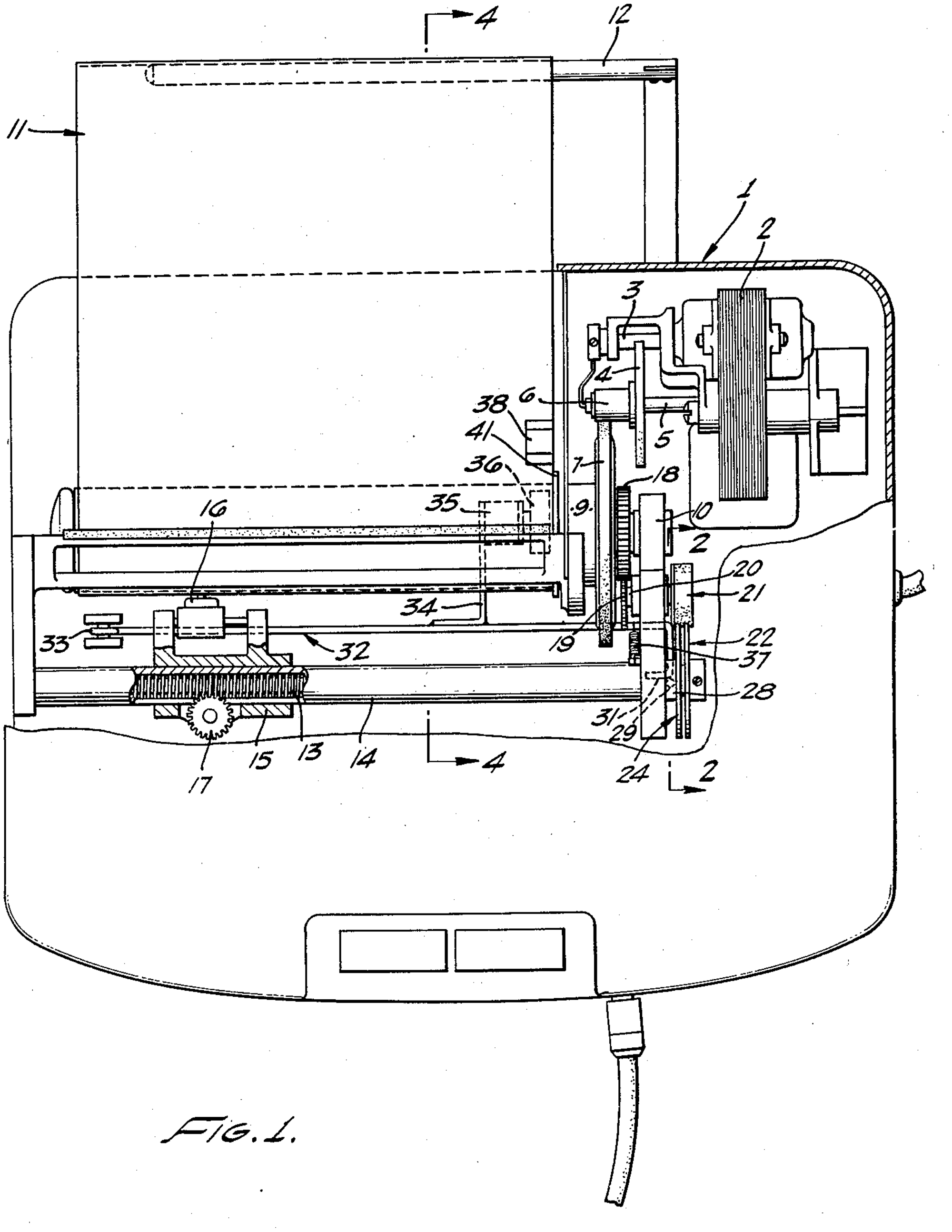
Figure 1 is a top view of a dictating and transcribing machine with the cover broken away and showing the record belt and sound track control means, and indicating fragmentarily other portions of the dictating machine essential to the operation of the record belt and control means.

The record belt and sound track control means is intended primarily for use in conjunction with a dictating and recording machine. The machine includes a housing 1 in which is mounted a drive motor 2 having a drive shaft 3. The drive shaft 3 rotates an idler wheel 4 mounted on a countershaft 5 which carries a second idler wheel 6 of small diameter, which in turn drives a drum wheel 7 secured to the end of a drum shaft 8. Mounted on the drum shaft 8 is a cylindrical drum 9. The drum shaft 8 is suitably supported cantilever-wise by a bearing carried by framework 10.

The drum 9 is adapted to rotate an endless magnetic record belt 11 which forms a part of the present invention. The record belt 11 is considerably larger than the drum 9, and its free end passes around a guide rod 12.

Suitably supported on the framework 10, parallel with the drum 9, is a lead screw shaft 13, which is contained within a slotted sleeve 14. The sleeve 14 slidably supports a carriage 15 on which is mounted a conventional recording and pickup head 16. A gear connection 17 is provided between the carriage 15 and the lead screw shaft 13. When the carriage 15 is being advanced by rotation of the lead screw shaft 13, the gear 17 is fixed so that it functions in the manner of a half nut.

Except for the record belt 11 which is substituted for the conventional record belt, the mechanism so far described is conventional. In the conventional machine, the lead screw shaft 13 is connected by gears to the drum 9 so that the lead screw shaft 13 rotates continuously with rotation of the drum 9.

In the exercise of the present invention, an intermittent drive means is substituted for the conventional drive means. The intermittent drive means includes a gear 18 mounted on the drum shaft 8 which engages a second gear 19 mounted on a countershaft 20. Also mounted on the countershaft 20 is a friction drive wheel 21. Mounted at the end of the lead screw shaft 13 is an intermittent drive wheel 22 which is circular except for a clearance notch 23.

Rotatably mounted on the lead screw shaft 13 is a trip disk 24 having a drive-wheel-engaging section 25. The trip disk 24 is connected with the wheel 22 by means of a lost motion slot 26 through which extends a pin 27 secured to the wheel 22. The trip disk 24 is preferably secured to a hub 28. Extending radially from the hub 28 is a stop pin 29. A spring 30 is secured at its ends to the stop pin 29 and the pin 27 and is wrapped partially about the hub 28.

The stop pin 29 is adapted to be engaged by a retainer finger 31 which forms the end of a lever arm 32. The lever arm extends substantially parallel with the drum 9 and lead screw shaft 13 and is located below these members. The end of the lever arm 32 remote from the retainer finger 31 is secured to a fulcrum element 33. A lateral arm 34 extends from the lever arm 32 under the drum 9.

The extremity of the lateral arm 34 is provided with a yoke 35 which carries a roller 36. The roller 36 bears upwardly against the drum 9 and is located so as to ride on one margin of the record belt 11. A spring 37 maintains the roller 36 in engagement.

The margin of the record belt 11 engaged by the roller 36 is provided with a small cam lug 38 which is sufficient to depress the roller 36 and the retainer finger 31 so as to clear the stop pin 29. That is, the retainer finger 31 moves from the position shown in Fig. 2 to the position shown in Fig. 3 when the roller 36 is depressed by the cam lug 38.

Figure 2:
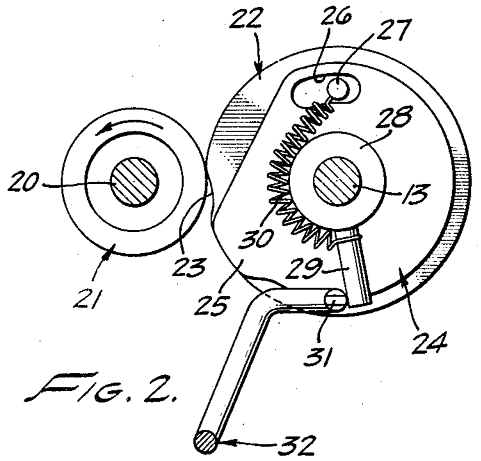
Fig. 2 is an enlarged fragmentary sectional view through 2—2 of Fig. 1 showing the control means in its dwell position.

Operation of the intermittent drive means is as follows:

Normally, the retainer finger 31 engages the stop pin 29 as shown in Fig. 2. The location of the clearance notch 23 in the driven wheel 22 and the drive-wheel-engaging section 25 on the trip disk 24 is such that when the stop pin 29 is retained by the finger 31 the clearance notch 23 confronts the drive wheel 21. Under these conditions there exists a slight bearing engagement between the driven wheel 22 and the drive wheel 21 to advance the pin 27 in its slot 26 so that the spring 30 is under tension. The spring may be quite weak so that the force exerted on the driven wheel 22 is nominal.

Figure 3:
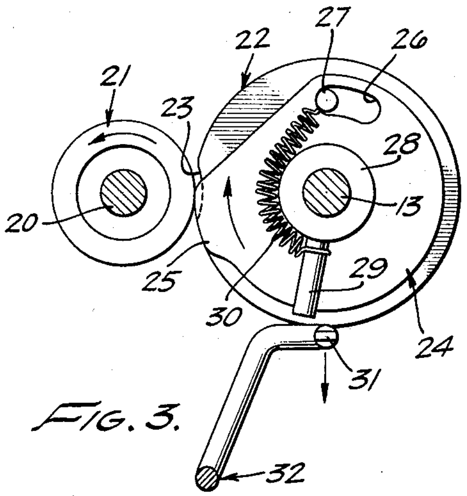
Fig. 3 is a similar fragmentary sectional view showing the control means at the start of its drive cycle.
Figure 4:
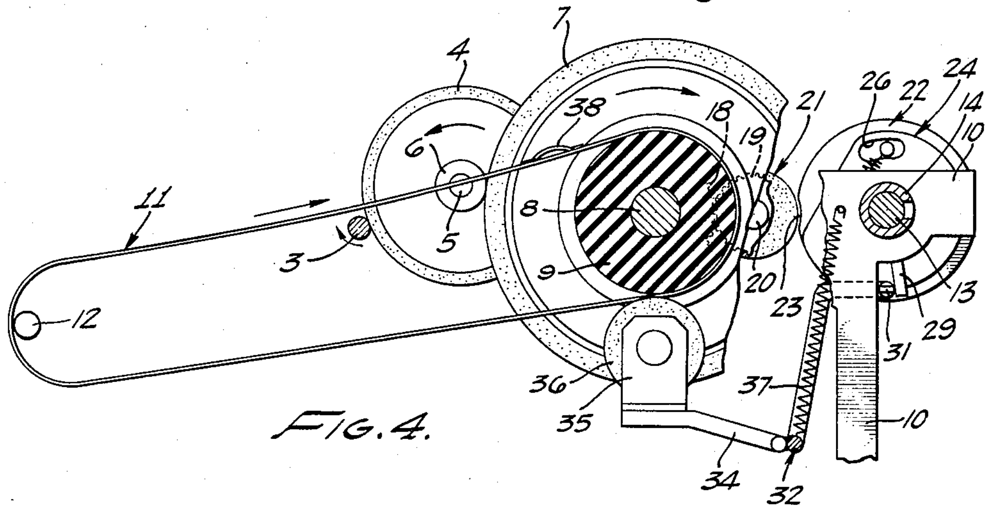
Fig. 4 is an enlarged transverse sectional view through 4—4 of Fig. 1 showing the record belt with its drive mechanism as well as the sound track control means.

Upon release of the stop pin 29 the spring 30 moves the trip disk 24 in a clockwise direction, as viewed in Figs. 2 and 3, to bring the wheel section 25 into engagement with the drive wheel 21, as shown in Fig. 3. When this is accomplished, the trip disk 24 and driven wheel 22 move in unison until the clearance notch 23 passes the drive wheel 21, whereupon the drive wheel 21 causes a single rotation of the driven wheel 22 until the clearance notch 23 is again in registry. At this point the stop pin 29 is again engaged by the retainer finger 31.

When the intermittent drive means is in its dwell position, as shown in Fig. 2, the recording head 16 does not advance axially of the record belt 11. During rotation of the driven wheel 22 and lead screw shaft 13, the recording head 16 advances axially of the record belt 11 to form a helical path.

Figure 5:
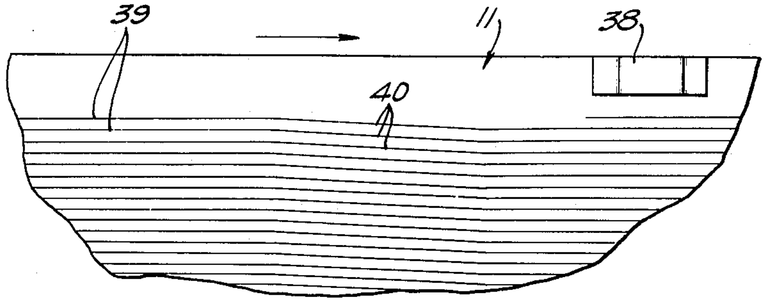
Fig. 5 is a fragmentary view of the record belt, indicating the path of the sound track thereon.

For purposes of illustration the center line of the sound track or potential sound track is indicated fragmentarily in Fig. 5. For each cycle or convolution of the record belt 11 there is formed an actual or potential nonhelical sound track section 39 connected to the adjacent sound track by a helical sound track section 40.

The starting and terminal points of each sound track section 39 and 40 are in fixed, predetermined, circumferential relation with the cam lug 38. It is immaterial whether the helical sound track section 40 occupies a relatively short section of the belt, as shown in Fig. 5, or that the non-helical sound track section 39 occupies only a shaft section. Furthermore, the helical sound track section 40 may be even more abrupt than shown in Fig. 5.

Irrespective of the relative lengths of the helical and nonhelical sound track sections 40 and 39, because of their fixed circumferential relation with the cam lug 38, proper registry of the recording and pickup head 16 may be maintained.

It should be noted that the conventional dictating machine for which the record belt 11 is adapted is provided with a stop 41 at the inner end of the drum 9, and various conventional biasing means, not shown, are used to urge or maintain the edge of the record belt 11 in engagement with the stop 41. That is, in the conventional dictating machine there is an accurate spatial relation between the edge of the record belt 11 and the screw threads of the lead screw shaft 13. However, in the conventional record produced by the conventional dictating machine the sound track is a continuous helix, and unless the belt 11 is oriented circumferentially relative to the drum 9 the recording head 16 will not register with the track.

It has been the practice to provide slight lateral adjustment of the belt 11 or the carriage 15 to bring the sound track and recording head 16 into registry. However, in the conventional machine the belt 11 slips an indeterminate amount on the drum 9 so that in spite of the accurate positioning of the belt 11 axially on the drum 9 continuous registry of the recording head 16 and sound track is not attained.

In the exercise of the present invention, the lead screw shaft 13 always stops in the same position when the intermittent drive is in its dwell position so that the lead screw shaft functions as a rack with its teeth in predetermined spatial relation with the stop 41. As indicated before, the gear wheel 17 may be considered as occupying a fixed position. Actually, in the conventional machine the gear 17 is moved a tooth at a time by a remotely controlled solenoid to back space the carriage.

Thus, for every position of engagement of the gear wheel 17 and rack teeth, there is a corresponding nonhelical portion of the actual or potential sound track in exact registry with the recording and pickup head 16.

If the record belt 11 should be placed in the machine so that the helical section 40 of a sound track is opposite the recording head 16, the cam lug 38 will of necessity be beyond the roller 36 and the intermittent drive member in its dwell position. Thus as soon as the helical section has passed the recording head 16, the subsequent nonhelical section will be in registry with the sound recording head. The sound track and recording head 16 will subsequently remain in registry for every other position of the carriage 15 along the lead screw shaft 13. This is true whether the carriage 15 is advanced by rotation of the shaft or whether the carriage is manually shifted from one position to another, or whether the carriage is back spaced one or more teeth of the gear wheel 17.

Thus, it will be seen that when the machine is used for dictation the carriage 15 may be manually moved in either direction or back spaced in the conventional manner without disturbing the registry of the recording and pickup head 16. Also the belt 11 may be removed or replaced without loss of registry.

When the machine is used for transcribing, a series of belts may be inserted for transcription without loss of registry.

It will be observed that for purposes of maintaining registry the relative lengths of the helical and nonhelical portions of each convolution may bear any preselected ratio. For example, the intermittent movement of the lead screw shaft 13 may be quite rapid, even abrupt, so that the helical portion 40 is quite short. Conversely, the helical portion may occupy almost the entire convolution, permitting slow rotation of the lead screw shaft 13. In this case the actual or potential sound track may approach so close to a true helical path that a record produced by a machine incorporating the present invention may be transcribed on a conventional machine. That is, the lateral departure of a short nonhelical section of, for example, a one-half inch section in a twelve inch band, is too slight to be noticed.

Conversely, a helical record made on a conventional machine could be transcribed on a machine embodying the present invention.

It is, of course, obvious that in the use of the special record with its helical and nonhelical sections on a conventional machine the conventional means for lateral adjustment to attain registry must be used; and, conversely, the use of a conventional record belt on a machine incorporating the present invention would require the use of a similar conventional adjustment.

Although in such interchanged use the advantages of the present invention are not fully realized, the compatibility of conventional and special machines is important where several machines, both old and new, may be in use.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A dictating and transcribing machine, comprising: a rotatable drum; means for rotating said drum at a constant speed; a flexible magnetizable endless belt member substantially larger in diameter than said drum and adapted to wrap about a portion of the drum; a drive screw disposed in parallel relation to said drum; a recording and pickup head connected with said drive screw for movement axially of said drum to record or detect a multiple convolution sound track on said belt; an intermittent drive means for said drive screw including a continuously rotating drive wheel and a driven wheel mounted on said drive screw and having a periphery engageable with said drive wheel to effect rotation of said drive screw, said driven wheel having a notch in its periphery to clear said drive wheel, thereby to limit said driven wheel to approximately one revolution on each engagement by said drive wheel, a trip wheel journaled about the axis of said driven wheel and having an arcuate portion engageable with said drive wheel, a spring tending to urge said trip wheel to a position wherein said arcuate portion bridges said notch, a lever having an end engageable with said trip wheel to hold said arcuate portion clear of said notch, and means on said belt member for moving said lever to free said trip wheel thereby to release said driven wheel and effect a revolution of said drive screw, whereby during a predetermined portion of travel of said belt member said recording head is advanced axially, and during the remaining portion of travel of said belt member said recording head remains axially fixed.

2. In combination with a dictating and transcribing machine having a rotatable drum adapted to receive a recording belt, a drive screw disposed parallel to the drum, a recording and pickup head mounted for movement axially by said drive screw to record and detect a multiple convolution sound track on said belt, a clutch-controlled drive means for said drum, and a drive wheel for said drive screw rotatable on actuation of the drive means for said drum, of an intermittent drive mechanism interposed between said drive wheel and drive screw, comprising: a driven wheel mounted on the drive screw for engagement with said drive wheel and having a notched portion in its periphery clearing said drive wheel; a trip wheel mounted adjacent said driven wheel and having an arcuate section adapted to bridge said notched portion and capable of arcuate displacement relative to said driven wheel between a bridging position and a position clearing said notched portion; a spring disposed between said driven wheel and trip wheel urging said trip wheel toward its bridging position; a trip lever having an end engageable with said trip wheel to restrain said trip wheel in its non-bridging position; and means on said belt for engaging said trip lever thereby to release said trip member for movement to its bridging position and effect a driving connection between said drive wheel and driven wheel.

References Cited in the file of this patent

UNITED STATES PATENTS

| | | |
|---|---|---|
| 2,568,681 | Kuhlik | Sept. 18, 1951 |
| 2,680,025 | Goodwin | June 1, 1954 |